United States Patent [19]

Blytas et al.

[11] Patent Number: 5,656,576
[45] Date of Patent: Aug. 12, 1997

[54] REDUCING POLYETHERCYCLOCPOLYOL METAL ADHESION

[75] Inventors: George Constantine Blytas; Arthur Herman Hale, both of Houston, Tex.

[73] Assignee: Shell Oil Company, Houston, Tex.

[21] Appl. No.: 341,713

[22] Filed: Nov. 18, 1994

[51] Int. Cl.$^6$ ............................................. C09K 7/00
[52] U.S. Cl. .................. 507/136; 549/379; 507/137; 507/139; 507/140; 507/145
[58] Field of Search ............................ 549/379; 507/136, 507/137, 139, 140, 145

[56] References Cited

U.S. PATENT DOCUMENTS

| | | | |
|---|---|---|---|
| 5,371,244 | 12/1994 | Blytas | 549/378 |
| 5,412,115 | 5/1995 | Zurich et al. | 549/378 |

*Primary Examiner*—Samuel A. Acquah
*Attorney, Agent, or Firm*—Fred Marlowe

[57] ABSTRACT

Reducing the adherence of polyethercyclicpolyol to metal by exposing the metal to a selected surfactant.

8 Claims, No Drawings

REDUCING POLYETHERCYCLOCPOLYOL METAL ADHESION

BACKGROUND OF THE INVENTION

Polyethercyclicpolyol (PECP) has been tested as an additive for aqueous drilling muds. In this test, the performance of PECP was evaluated and found to match or exceed expectations with regard to those characteristics which were used in optimizing its molecular structure and properties. The five performance criteria that were used to guide and optimize synthesis efforts were (1) fluid loss inhibition, (2) inhibition of shale swelling, (3) inhibition of cuttings dispersion, (4) thickness of filter cake, and (5) toxicity. The performance of PECP base muds in the field test was superior in all five aspects for which experimental testing had been conducted. However, it was found that in the tests, drilling muds containing 5–10% by weight PECP tend to adhere to stabilizer surfaces. Stabilizers are large, metallic vanes, 8–10 ft long, attached radially from the drilling shaft. The tendency of PECP-containing muds to adhere to the stabilizers causes frictional resistance to drilling and slows the rate of penetration. This effect also results in "bit-bailing," i.e., formation of masses of drilling-mud containing the cuttings which stick to the drilling bit.

SUMMARY OF THE INVENTION

Accordingly, responsive to the above problem in the art, the present invention is directed to means for reducing the adhesive tendency of PECP towards metal. It has been found that the cause of this effect can be attributed at least in part to two factors: (1) higher than optimal PECP dosage and (2) adhesion of the polar hydroxyl groups to the metallic surface. Accordingly, the present invention, in solving this problem in the art, optimizes the PECP dosage and/or uses surfactants which adhere to the surface of the metal strongly.

DESCRIPTION OF PREFERRED EMBODIMENTS

In accordance with the present invention various surfactants were tested to determine which was the most effective in preventing the adherence of drilling mud containing polyethercyclicpolyol to drilling apparatus surfaces. In many cases compounds from the same class showed variable responses, although responses from a given surfactant were substantially repeatable. A concentration of 20 ppm to 2% w surfactant in the drilling fluid is suitable for use with the invention, although a concentration of 50 ppm to 0.5% w is preferred, the concentration depending on the choice of surfactant or polysurfactant.

Polyethercyclicpolyols (PECP) useful in the present invention are prepared by condensing polyol molecules by reactive distillation. In this process, water molecules are removed and ether bonds are formed by polymerizing the monomeric glycerol. In the polymeric PECP structure, for every glycerol unit of free carbons, about 1.2 moles of water is removed, leaving 1.8 oxygen atoms either as ethers, or as hydroxyl groups. The preparation is completed by making small additions of glycerol, after at least 80% of the reaction has been completed or advancing to the degree of the hydration. Typically, three additions of glycerol are carried out during the last leg of the reaction, and the last 18–20% of the dehydration is accomplished while adding only 9–12% of the reacting glycerol.

EXAMPLES

The effectiveness of the surfactant additives in reducing adhesion to metallic surfaces was tested by studying the spreading behavior of a thin layer of the liquid sample on standardized metal surfaces. The surfaces used were cold-rolled carbon steel 4"×12" coupons (Q-panels). On those panels a 4-mill thick layer was spread with a "doctor's blade" and the spreading behavior was recorded.

The surfactants and polysurfactants being screened were mixed with a commercial sample of PECP manufactured by Baker Performance Chemicals. The effectiveness of the various preparations and surfactant additions was obtained in terms of the service coverage of the Q-panel after 2 hours or overnight standing. Qualitatively, in those preparations that were assessed to be successful, the fluid film pulled away from the metal, leaving dry a significant portion of the surface. In several cases, the effectiveness of treatment appeared to improve with time. However, this is probably due to loss of water by evaporation. Thus, the 2-hour data is considered more meaningful. In most cases the behavior observed in a few minutes was as good a predictor as a 2-hour result.

To compare effectiveness, the results are shown on a scale of 0 (zero) to 10, where zero indicates no effect and 10 indicates maximum exposure of bare metal. No 10 ratings were recorded in this study, and may be theoretically impossible to obtain with a non-negligible volume of filming solution.

For surfactants the highest improvement was observed with a perfluorinated ester, FC-430, with a rating of 8 at 200 ppm, and of 6 to 7 at 100 ppm. Silicone oil at 0.5% w yielded 7; cetyl trimethylammonium bromide yielded 5 at 0.3% w; nitrogen-based imidazoline corrosion inhibitor yielded 3 to 4 at 0.1 to 0.2% w. Effective surfactants were also the polyglycerol ester of oleic acid (5), and the polysurfactant pentaerythritol tetraricinolate (6), both at 0.1% w. In contrast the following surfactants were found to be ineffective: the fluorosurfactants Zonyl FSN, FSP, and FSO at 100 ppm, Neodol-91 at 2% w, and various other fatty acid esters.

The performance of surfactants and polysurfactants yielding ratings of 5 or less is improved when the PECP component of the solution is replaced by PECP preparations suitably modified to yield a more hydrophobic structure.

What is claimed is:

1. A process for reducing bit-balling in the drilling of an oil well with a water base drilling fluid containing polyethercyclicpolyol comprising:

exposing the metal of the drill bit to a surfactant which adheres to the metal and presents a nonpolar surface to the polyethercyclicpolyol.

2. The process of claim 1 wherein the surfactant is a perfluorinated ester.

3. The process of claim 1 wherein the surfactant is silicone oil.

4. The process of claim 1 wherein the surfactant is an imidazoline-base corrosion inhibitor.

5. The process of claim 1 wherein the surfactant is an imidazoline-base corrosion inhibitor.

6. The process of claim 1 wherein the surfactant is a polyglycerol ester of oleic acid.

7. The process of claim 1 wherein the surfactant is a pentacrythritol tetraricinolate.

8. The process of claim 1 wherein the surfactant is flurosurfactant.

* * * * *